(12) United States Patent
Glatter

(10) Patent No.: US 8,992,032 B2
(45) Date of Patent: Mar. 31, 2015

(54) NEWTONIAN TELESCOPE SECONDARY MIRROR MOUNT AND ADJUSTMENT METHOD

(76) Inventor: Charles Howard Glatter, Bronx, NY (US)

( * ) Notice: Subject to any disclaimer, the term of this patent is extended or adjusted under 35 U.S.C. 154(b) by 1954 days.

(21) Appl. No.: 12/180,912

(22) Filed: Jul. 28, 2008

(65) Prior Publication Data

US 2009/0027790 A1    Jan. 29, 2009

Related U.S. Application Data

(60) Provisional application No. 60/961,972, filed on Jul. 26, 2007.

(51) Int. Cl.
  *G02B 7/182*    (2006.01)
  *G02B 23/16*    (2006.01)
(52) U.S. Cl.
  CPC .............. *G02B 7/1825* (2013.01); *G02B 23/16* (2013.01)
  USPC ........................................................ 359/872
(58) Field of Classification Search
  None
  See application file for complete search history.

(56) References Cited

U.S. PATENT DOCUMENTS

| 4,134,638 A | 1/1979 | Drauglis |
| 2009/0027790 A1* | 1/2009 | Glatter ........................ 359/874 |

OTHER PUBLICATIONS

J.B. Sidgwick, Amateur Astronomer's Handbook 185 (3d ed. 1971).*
Texereau, Jean, "How to Make a Telescope", $2^{nd}$ edition, Willmann-Bell, Inc., pp. 127-128.

* cited by examiner

*Primary Examiner* — J Doak
(74) *Attorney, Agent, or Firm* — Swanson & Bratschun, L.L.C.

(57) ABSTRACT

A Newtonian telescope secondary mirror mount which includes means for attaching a Newtonian telescope secondary mirror to the secondary mirror mount. The attachment means will define a secondary mirror plane. The mount also includes first and second means for adjusting the angular alignment of the secondary mirror plane. The first adjustment means defines a first adjustment axis and the second adjustment means defines a second adjustment axis. In all embodiments both the first and second axes of angular orientation adjustment are substantially parallel to the secondary mirror plane. Methods of adjusting the angular alignment of a Newtonian telescope secondary mirror are also disclosed.

19 Claims, 8 Drawing Sheets

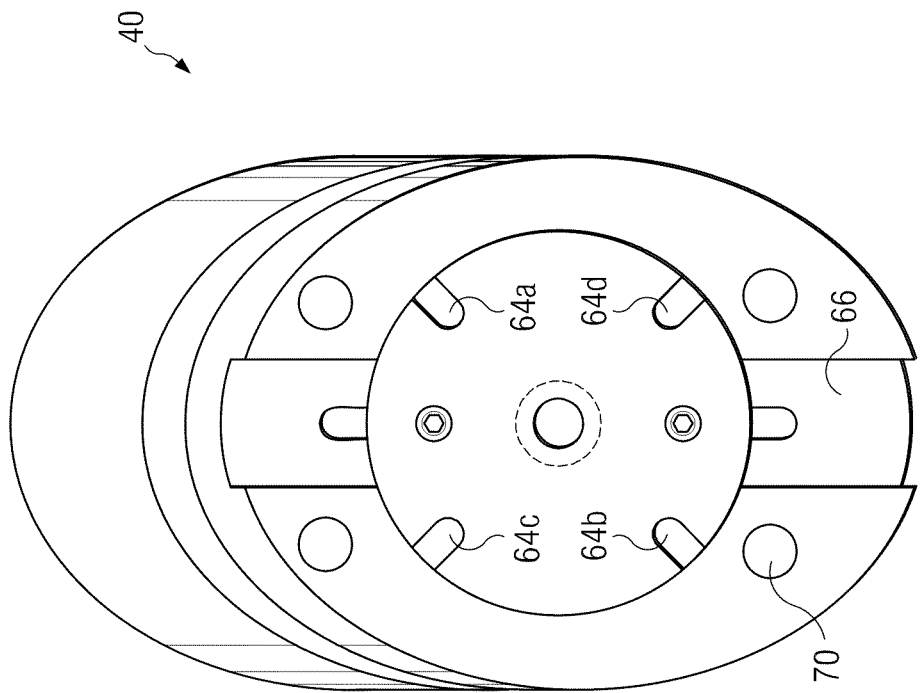
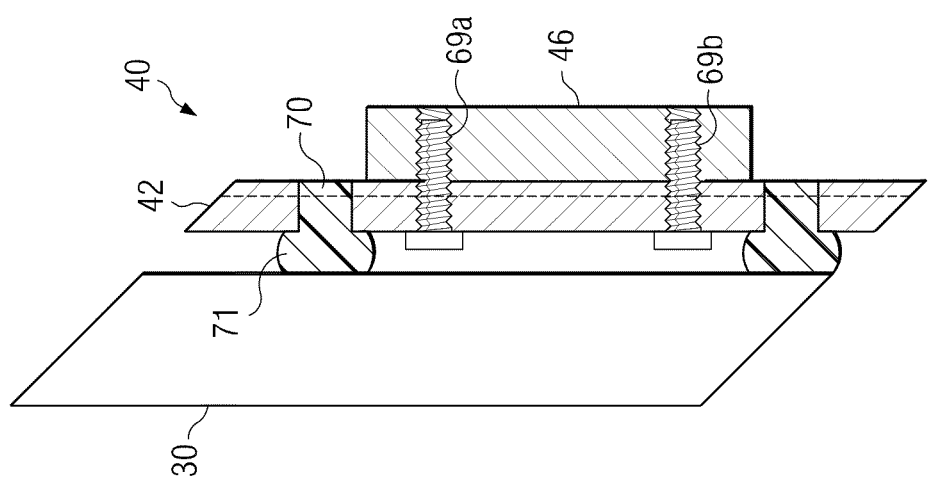

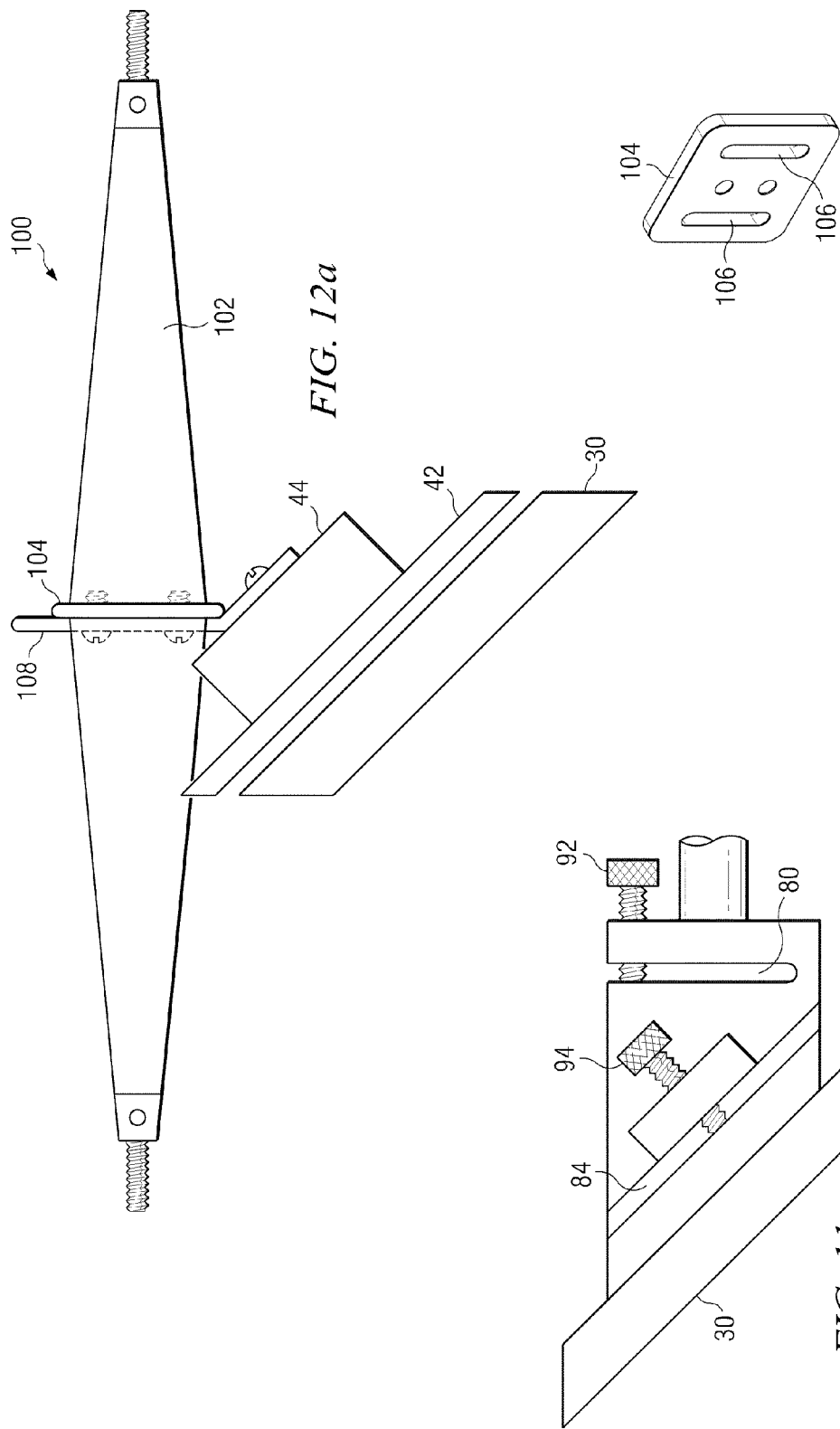

NEWTONIAN TELESCOPE SECONDARY MIRROR MOUNT AND ADJUSTMENT METHOD

RELATED APPLICATIONS

This application claims the benefit of priority pursuant to 37 C.F.R. §119(e) to U.S. Provisional Patent Application No. 60/961,972, entitled "Newtonian telescope diagonal mount," filed Jul. 26, 2007, which is incorporated herein in its entirety by reference for all that it teaches and discloses.

TECHNICAL FIELD

The present invention is directed toward an improved Newtonian telescope secondary mirror mount and more particularly toward a secondary mirror mount and method for adjusting a Newtonian secondary mirror which features angular adjustment about first and second axes both of which are parallel to the plane of the secondary mirror face.

BACKGROUND

The Newtonian telescope is named after its inventor, Sir Isaac Newton. A typical Newtonian telescope is schematically illustrated in FIG. 1. In the conventional Newtonian design, light is collected by a parabolic primary mirror 10 which is positioned in a telescope tube 12 opposite an opening 14 which is pointed at the sky. The parabolic surface of the primary mirror reflects collected light back up the tube along the optical axis of the primary toward a focal plane, the position of which is determined by the diameter and focal ratio of the primary mirror. Before the converging reflected light beam reaches a focal or image plane however, the beam is reflected at a substantially 90° angle toward and through the telescope tube by a secondary mirror 16 or less commonly by a prism. The Newtonian secondary mirror 16 is also commonly known as a diagonal or diagonal mirror. The secondary mirror or prism is positioned with respect to the primary mirror at a carefully selected distance so that the focal plane may be conveniently accessed with an ocular or camera associated with a focuser 18 on the outside of the telescope tube.

The secondary mirror in a classical Newtonian design has a precisely planar front surface which faces the primary mirror. This front surface is aluminized or otherwise made highly reflective. Secondary mirrors typically are ellipsoid in shape having a major axis and minor axis. The tilted elliptical shape of the secondary mirror provides a circular profile to incoming light rays. The substantially circular elliptical shadow has a diameter substantially equal to the width of the minor axis of the ellipse. Thus, an elliptical mirror may maximize the reflective surface area presented to the converging light beam while minimizing the actual obstruction placed into the path of incoming light rays.

As shown in FIG. 2, the secondary mirror 16 is typically supported by a secondary mirror mount 19. Referring back to FIG. 1, it may be noted that the secondary mirror mount is usually supported by a spider assembly 20 which may include one or more straight or curved vanes or legs which suspend the secondary mirror mount at the appropriate place inside the telescope tube. The proper functioning of a Newtonian telescope is dependent upon the effective collimation of each optical element such that the focal plane produced by the optics is positioned accurately with respect to the focuser and not unduly tilted with respect to the optical axis of an ocular or the image plane of a camera connected to the focuser. To achieve proper collimation, both the primary mirror mount and the secondary mirror mount may incorporate various adjustment apparatus.

To achieve proper Newtonian collimation at the secondary mirror, at least three types of alignment criteria must be observed. In particular, the lateral positioning of the secondary mirror in a plane perpendicular to the optical axis of the primary mirror must be adjusted so that the center point of the secondary mirror is substantially on the optical axis of the primary, or offset slightly away from the optical axis of the primary mirror to achieve certain advanced optical performance goals. Secondarily, the positioning of the secondary mirror along a line parallel to the optical axis may be adjusted and offset as well to achieve similar performance goals. Thirdly, the angular alignment of the secondary mirror with respect to the primary optical axis must be adjusted to make the optical axis of the primary mirror and the optical axis of a selected ocular coincide.

The first and second types of adjustment described above are of relatively minor importance when compared to the angular alignment adjustment. For example, failure to achieve perfect lateral alignment or perfect positioning along the optical axis of the primary will result in the secondary mirror not being placed precisely at the center of the primary optical axis. This defect will be unnoticed if the secondary is slightly oversized. Non-centering error may result in uneven field illumination or vignetting but will not otherwise introduce optical aberrations into the system provided that accurate angular alignment is maintained. On the other hand, failure to properly angularly align the secondary mirror with the optical axis of the primary will cause the image plane to be substantially tilted with respect to the optical axis of an ocular or a camera image plane. This error will both enhance aberrations such as coma which are inherent in the Newtonian design and introduce optical aberrations throughout the image plane which are not otherwise inherent in the system.

Most known Newtonian secondary mounts include apparatus for adjusting the angular alignment of the secondary mirror. For example, as shown in FIG. 2, many secondary mirror mounts include three or four adjustment screws 22 which articulate a joint between a secondary mirror holder 24 and a mount body 26 which is attached with a bolt or stud 28 to the spider assembly. The prior art embodiment shown in FIG. 2 has four adjustment screws. Each of these screws acts along a line parallel to the optical axis of the primary. Two of the screws, 22a and 22b, articulate the secondary mirror about axis x-x which is substantially orthogonal to the primary optical axis. It will be readily noted that axis x-x is also parallel to (although offset quite far from) the minor axis of the secondary mirror. The remaining two adjustment screws 22c and 22d however, articulate the secondary mirror about the axis shown on FIG. 2 as y-y. Axis y-y is not parallel to the secondary mirror plane.

The angular alignment of a secondary mirror with respect to the optical axis of the primary mirror may be visualized as having two components. The major axis of the secondary must be positioned to intercept the converging light cone at a 45° angle (assuming that the focuser is positioned at a 90° angle with respect to the primary axis, which is a nearly universal design goal) while the minor axis of the secondary mirror remains orthogonal to the primary optical axis. Since secondary adjustment screws 22c and 22d define an adjustment axis which is not parallel to a plane defined by the face of the secondary mirror, adjustment about this axis effects both the angular orientation of the major axis and the orthogonality of the minor axis. Therefore adjustments which are made in a conventional design about axis y-y interact with previous or future adjustments made about axis x-x. Accordingly, the proper angular collimation of a Newtonian secondary using a conventional secondary mirror mount becomes a tedious reiterative process which may be difficult to perform correctly.

In addition, adjustment mechanisms which articulate at a distance relatively far from the mirror face as shown in FIG. 2 necessarily result in a relatively large amount of side to side or fore-aft translation motion or swing of the entire mirror when adjustments are made. Thus, angular adjustments made with a conventional secondary holder as shown in FIG. 2 may complicate attempts to accurately place the secondary mirror laterally or along the primary optical axis. The commonly available alternative secondary mirror holders which have three independent alignment screws acting parallel to the primary axis define three separate adjustment axes only one of which can potentially be parallel with the plane of the secondary mirror. Thus, adjustments made to the angular orientation of the secondary mirror with any of three angular adjustment screws will also interact with the adjustments made with other angular adjustment screws.

The embodiments disclosed herein are directed toward overcoming one or more of the problems discussed above.

SUMMARY OF THE EMBODIMENTS

One embodiment disclosed herein is a Newtonian telescope secondary mirror or prism mount which includes means for attaching a Newtonian telescope secondary mirror or prism to the secondary mirror mount. The attachment means will define a secondary mirror plane. This embodiment also includes first and second means for adjusting the angular alignment of the secondary mirror plane. The first adjustment means defines a first adjustment axis and the second adjustment means defines a second adjustment axis. In all embodiments both the first and second angular orientation adjustment axes are substantially parallel to the secondary mirror plane.

The first and second angular orientation adjustment axes may be substantially orthogonal to each other. In addition, the first and second angular orientation adjustment axes may be substantially co-planar with the secondary mirror plane.

The attachment means may include a mirror backing plate and the mount may further include a mount body operatively associated with the mirror backing plate. In one embodiment, the mount body includes a pivot disk, a pivot stud in articulated association with the pivot disk and an adjustment screw disk operatively associated with the pivot stud. The adjustment of first and second screws, or first and second sets of screws associated with the adjustment screw disk may be made to articulate the pivot disk which translates to an angular orientation adjustment to a secondary mirror which may be associated with the attachment means and pivot disk.

An alternative embodiment of the mount body may include first and second slots through a selected portion of the mount body. The slots define compliant hinges. The slots may be planar parallel to the mirror plane and may be articulated with screws threadably engaged with the mount body.

Any embodiment of the various Newtonian telescope secondary mirror mounts disclosed herein may further include a selectively adjustable engagement between the means for attaching a mirror, for example a mirror backing plate, and the mount body. The selectively adjustable engagement, if provided, may include a slot which provides for the sliding adjustment of a mirror backing plate or other structure along a line parallel to the major axis of a secondary mirror that may be selectively attached to the backing plate.

The secondary mirror mount may also include a backing plate or other attachment means having at least one heating element and associated electronic circuitry to provide for the heating of an attached secondary mirror. The embodiments disclosed herein may also include means for connecting the secondary mirror mount to a spider. In one embodiment, the mount may be connected to a spider with a yoke and tongue assembly. Alternatively, the mount may be connected to the spider with a threaded bolt.

Another embodiment disclosed herein is a method of adjusting the orientation of a Newtonian telescope secondary mirror. The method includes adjusting the angular orientation of the Newtonian secondary about first and second axes, both of which are parallel to a mirror plane defined by the mount and parallel to the front surface of a Newtonian telescope secondary mirror. The method may further include adjusting the position of the secondary mirror along a line parallel to the major axis of the secondary mirror. The method may also include adjusting the position of the secondary mirror along a line parallel to the optical axis of an associated Newtonian primary mirror.

BRIEF DESCRIPTION OF THE DRAWINGS

FIG. 6a is a side sectional view of a secondary mirror mount showing an adjustable engagement between a mirror backing plate and pivot disk.

FIG. 6b is a rear perspective view of the secondary mirror mount of FIG. 6a.

FIG. 11 is a side sectional view of a secondary mirror mount.

FIG. 12a is a side view of a low profile spider assembly.

FIG. 12b is a perspective view of the yoke of the spider assembly of FIG. 12a.

FIG. 13 is a top plan view of the spider assembly of FIG. 12a.

DETAILED DESCRIPTION

Figure 3:
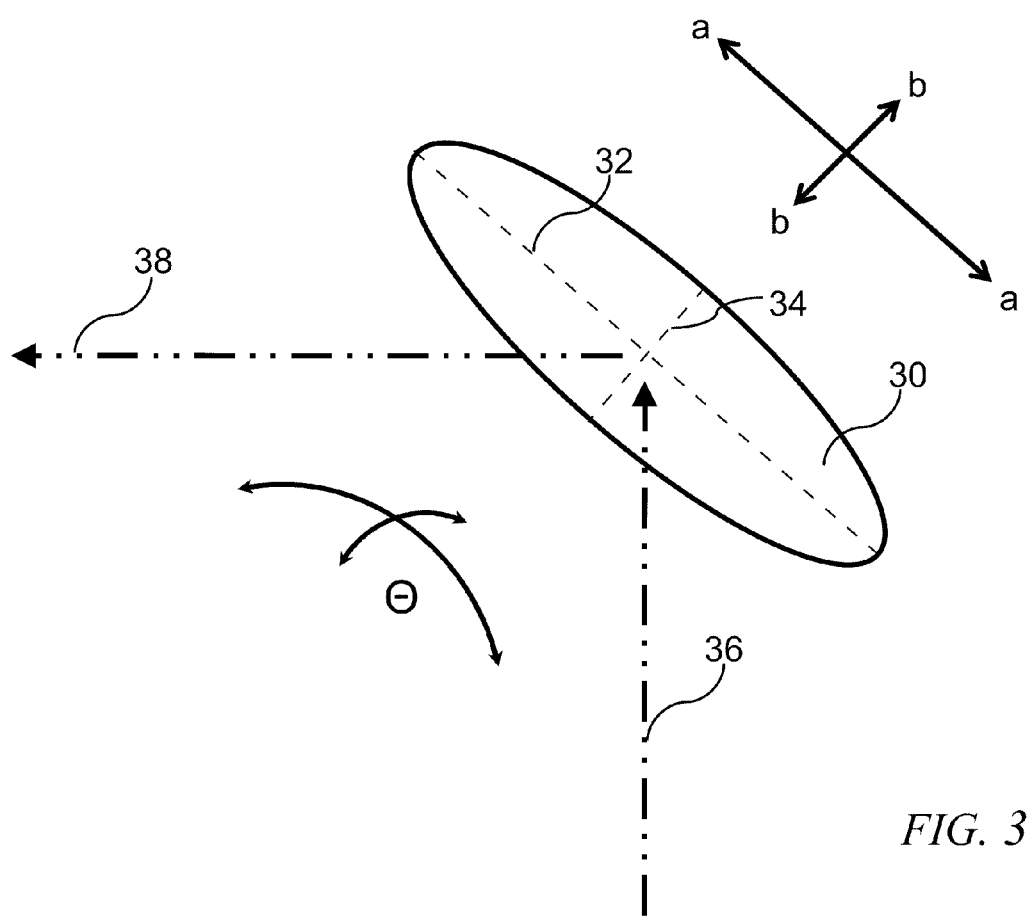
FIG. 3 is a schematic diagram of a secondary mirror mount.

Certain fundamental relationships between the optical components of a Newtonian telescope which underlie the embodiments disclosed herein are illustrated in FIG. 3. FIG. 3 includes a schematic perspective view of a secondary mirror 30 which has a major axis 32 and minor axis 34. As described above, the secondary mirror of a Newtonian telescope is also commonly known as the diagonal. The secondary could be, but typically is not, implemented with a prism. All embodiments disclosed herein could be adapted for use with a prism. The "diagonal" nomenclature is particularly appropriate since the function of a Newtonian secondary mirror 30 is to reflect a converging, substantially conical light beam which has previously been reflected from the parabolic front surface of a Newtonian primary mirror at a substantially 90° angle such that the focal plane or image plane created by the primary is formed outside of the telescope tube. In this manner, unnecessary shading of the primary mirror by an ocular or the observer's head may be avoided. On FIG. 3 the center line of the conical light beam reflected from the primary mirror which is coincident with the optical axis of the primary mirror is illustrated as the incident ray 36. The optical axis of the system after reflection off of the planar front surface of the secondary mirror 30 is illustrated by the reflected exit ray 38.

Figure 2:
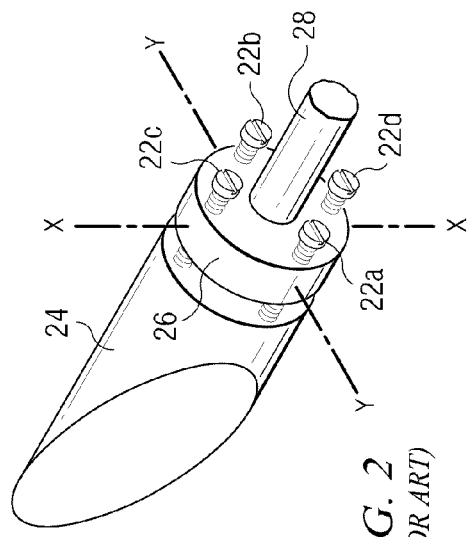
FIG. 2 is a perspective view of a prior art secondary mirror mount.

It is important to note that for ease of illustration the incident and reflected light beam are shown in the figures as lines or rays such as rays 36 and 38. The actual light beam reflected off of the parabolic surface of the primary mirror is substantially conical with the cone being truncated at the end opposite the primary mirror by an image or focal plane. Thus, the angular adjustment of the face of the secondary mirror 30 necessarily involves the orientation of a plane with respect to a cone. Accordingly, the angular adjustment of the secondary mirror plane with respect to the primary axis must be accomplished along two axes. This concept is schematically illustrated in FIG. 3 by showing that the angle Θ between ray 36 and 38 actually has two components. Known prior art apparatus or methods for adjusting the angular orientation of a Newtonian secondary mirror rely upon adjustment of the angular orientation of the mirror plane about two or more adjustment axes which are orthogonal to the primary optical axis. In the prior art as shown in FIG. 2, one of these axes (x-x) may incidentally be parallel to the plane of the secondary mirror phase. The other axis is not parallel to the plane of the secondary mirror face. With some apparatus no adjustment axis is parallel to the plane of the secondary mirror face. This particular characteristic of the prior art where at least one adjustment axis is not parallel to the plane of the mirror face requires adjustments made about one adjustment axis to interact with and effect adjustments made about another adjustment axis. The angular alignment of a secondary mirror thus becomes a tedious reiterative process having no well-defined end point.

On the contrary, all embodiments disclosed herein feature adjustment of the angular alignment of the secondary mirror plane about a first adjustment axis and about a second adjustment axis both of which are substantially parallel to the secondary mirror plane. These two (or more) planar parallel adjustment axes are schematically illustrated in FIG. 3 as adjustment axes a-a and b-b.

The adjustment axes a-a and b-b as illustrated in FIG. 3 may be implemented such that they are substantially orthogonal to each other. In such an implementation, adjustment of the angular orientation of the secondary mirror 30 about either axis will not effect the angular orientation of the mirror plane about the other axis. It will also be noted that axis a-a of FIG. 3 corresponds with the major axis 32 of the secondary mirror 30. Likewise, axis b-b corresponds with the secondary mirror minor axis 34. This particular configuration may have certain ease of use advantages. In particular, the person collimating a Newtonian telescope may be able to more easily visualize the effect of angular adjustment if the axes of adjustment correspond to the minor and major axes of the diagonal mirror. The embodiments disclosed herein are not limited to this particular configuration. The two or more adjustment axes may be positioned at any angle with respect to each other and at any orientation with respect to the surface of the secondary mirror 30, provided that at least two of the adjustment axes are substantially co-planar with the reflective front surface of the secondary mirror 30.

Various apparatus may be used to implement a secondary mirror mount which provides for angular adjustment along two axes both of which are parallel to the secondary mirror face. One such embodiment is the secondary mirror mount 40 illustrated in FIG. 4. All secondary mirror mounts will include means for attaching a Newtonian telescope secondary mirror to the mount and thus the rest of the telescope. The attachment means could be implemented with a sleeve that goes around some or all of the perimeter of a secondary mirror or with a structure which rests against or near some or all of the back side of the secondary mirror. The physical attachment of the mirror may be implemented with clips, adhesives, or other bonding methods. In all cases, the means for attaching the secondary mirror to the secondary mount will include structure, a surface or a compound which securely holds the secondary mirror in a desired orientation and thus defines a secondary mirror plane which corresponds to the planar front surface of the mirror itself.

Figure 4:
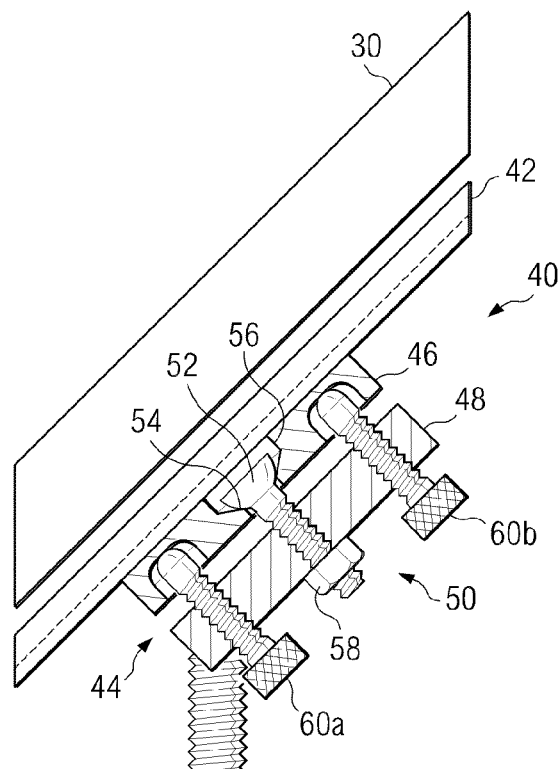
FIG. 4 is a side sectional view of a secondary mirror mount.

A representative means for attaching a Newtonian telescope secondary mirror to the secondary mirror mount 40 is a mirror backing plate 42 as shown in FIG. 4. In use, a mirror backing plate 42 may be bonded to the secondary mirror 30 with adhesives, clips or other structures which are not shown on FIG. 4. It is readily apparent how a mirror backing plate 42 defines a secondary mirror plane. In an alternative design, for example one featuring clips, the secondary mirror plane may be defined by an alternative structure such as the surface of the clips which engage the edge of the secondary mirror 30.

The embodiment illustrated in FIG. 4 also includes a mount body 44. As used herein, the mount body 44 will include means for adjusting the angular alignment of the secondary mirror plane about at least two axes which are substantially parallel to the secondary mirror plane. In the specific body illustrated in FIG. 4 the mount body 44 includes a pivot disk 46 and adjustment screw disk 48 which are connected in pivoting engagement by a pivot stud 50. The pivot stud 50 has a head 52 with a curved surface 54 which may be received in an appropriately shaped receptacle 56 associated with the pivot disk 46. Thus, the pivot disk may tip and tilt over a suitable range with respect to the adjustment screw disk 48 while remaining held captive against lateral displacement by the pivot stud 50. The pivot stud may be held in threaded engagement with the adjustment screw disk 48, fastened with a nut 58 or otherwise permanently or removably attached to the adjustment screw disk 48. The embodiment shown in FIG. 4 is illustrated as being implemented with a pivot stud 50 connecting the pivot disk 46 and adjustment screw disk 48. Other types of connections between these elements may be utilized provided that the angular orientation of the pivot disk 46 with respect to the adjustment screw disk 48 may be varied. For instance, the pivot disk 46 and adjustment screw disk 48 may be connected with a ball and socket joint, hinges, springs or another type of compliant member.

Also included in threaded engagement with the adjustment screw disk is a first pair of adjustment screws 60a and 60b. The spherical center points of the tips of adjustment screw 60a, 60b and the head 52 of the pivot stud 50 are substantially positioned along a line. This line is orthogonal to the first adjustment axis which in FIG. 4 is orthogonal to the plane of the two-dimensional illustration. As described in detail below, in alternative embodiments only one adjustment screw 60 may be desired. In the embodiment illustrated in FIG. 4, both adjustment screws 60a and 60b are threaded through the adjustment screw disk 48 into contact with the pivot disk 46. The orientation of the pivot disk 46 with respect to the adjustment screw disk 48 may be varied about the first adjustment axis by advancing one or the other adjustment screw 60a, 60b into contact with the pivot disk and thus articulating the pivot disk about the first adjustment axis. The second adjustment screw 60a or 60b (if present) may be used to lock the orientation thus selected.

Alternatively, a single adjustment screw 60 may be associated with the adjustment screw disk which is then biased and locked with a spring or other biasing mechanism. Alternative embodiments may be implemented with a combination of screws and springs. For example, a compression spring may be operatively placed around the exterior threading of an adjustment screw. The adjustment screws 60a and 60b are illustrated in FIG. 4 as having knurled thumb heads. Alternatively, these screws may be implemented with bolt heads, Allen socket heads, traditional screw heads or other mechanisms which may or may not require a tool for use.

Not shown on FIG. 4 is a second set of adjustment screws (62a, 62b, see FIG. 5) which are operatively positioned parallel to the first adjustment axis and which may articulate the pivot disk 46 about a second adjustment axis which is in the plane of the illustration. The second set of adjustment screws may be implemented with the various apparatus described herein and operated in the same manner as described above with respect to screws 60a and 60b.

Figure 5:
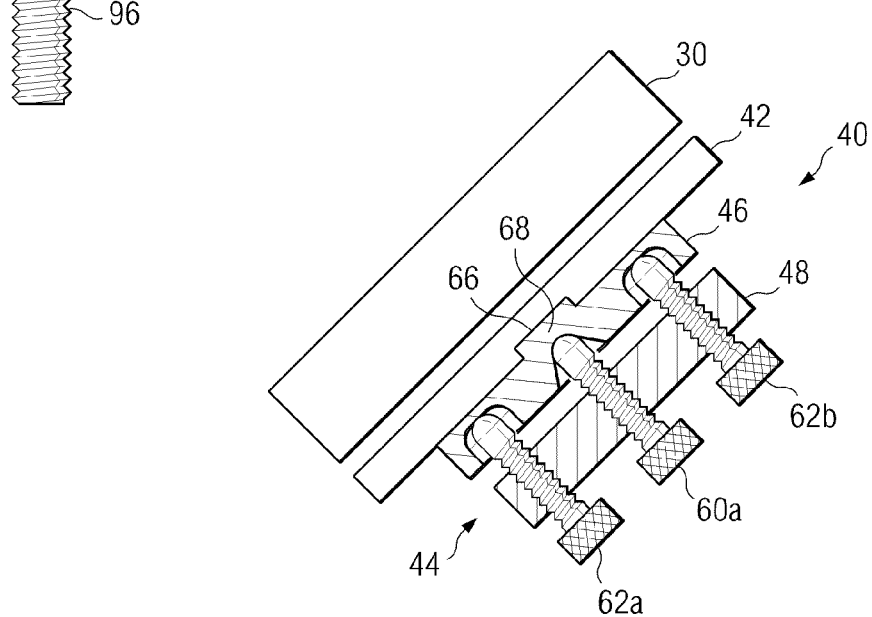
FIG. 5 is an end sectional view of the secondary mirror mount of FIG. 4.

An end plan view of this secondary mirror mount 40 is shown in FIG. 5. In this view, the respective orientation of the two adjustment axes is switched from the FIG. 4 view. In addition, the first adjustment screw 60b is not shown and is positioned below the plane of the illustration. The second adjustment screw 62a and 62b are illustrated in the end view. It may also be noted in the end view that four radial grooves 64 which may have round bottoms, tapered sides, or similar structures may be associated with the pivot disk to provide clearance for orthogonal adjustment with adjustment screws 60 and 62.

The secondary mirror 30 may be attached to the backing plate 42 as described above. Thus, the adjusted angular orientation of the backing plate (or other means for attaching the secondary) is translated to the mirror front surface. The mirror backing plate 42 may be statically attached to the pivot disk 46. For example, these structures could be glued, riveted, screwed together or machined, molded or otherwise fabricated from a single stock. Alternatively, adjustment of the lateral position of the secondary mirror 30 with respect to the optical axis of the primary mirror may be facilitated by implementing a selectively adjustable engagement between the mirror backing plate 42 or similar structure and the mount body 44. For example, as shown in FIG. 5, the mirror backing plate may have a slot or groove 66 which receives and corresponds with a tongue 68 or other extension associated with the pivot disk 46. These structures provide for the sliding adjustment of the position of the mirror backing plate 42 with respect to the mount body 44. Although this type of sliding or otherwise adjustable engagement may be implemented along any desired line certain functional advantages will be realized if the sliding engagement is parallel to the major axis 32 of the secondary mirror 30. Sliding adjustment along a line parallel to the major axis 32 of the secondary mirror 30 provides for a convenient way to offset the secondary mirror away from the focuser to achieve peak Newtonian telescope performance. The lateral position of the mirror backing plate 42 with respect to the mount body 44 may be fixed after adjustment with locking screws, clamps or other means described in detail below with respect to FIG. 6. Similarly, this adjustment may be implemented with structures other than the slot 66 and tongue 68 of FIG. 5. For example, the selectively adjustable engagement between the mirror backing plate and mount body may be implemented with linear bearings, corresponding smooth surfaces, or a simple slot which receives a locking screw or other means.

A slot 66 is more clearly illustrated in FIG. 6, where it may be noted that the pivot disk 46 may be slid along the slot 66 in the backing plate 42 a select distance along a line parallel to the secondary mirror major axis. After a selected offset is achieved by sliding the pivot disk 46 with respect to the backing plate 42 the respective position of these elements may be locked by securely engaging lock screws 69. FIG. 6 also provide an alternative view of the radial grooves 64 which may be associated with the pivot disk to provide clearance for orthogonal adjustment with adjustment screws 60 and 62. Another feature most readily apparent on FIG. 6 are optional holes 70 in the backing plate 42 which provide for a user to pump or otherwise apply uncured silicone sealant 71 or a similar adhesive from a squeeze tube through the backing plate and into contact with the back surface of a secondary mirror.

In the embodiment illustrated in FIGS. 4 and 5, the first and second adjustment axes are positioned parallel to the plane of the secondary mirror but offset away from the face of the mirror. This offset inevitably introduces some side to side or top to bottom translational motion of the mirror face when angular orientation adjustments are made. This translational motion will be of little consequence for most Newtonian telescope implementations. These extraneous motions are minimized in the embodiment of FIGS. 4 and 5 by positioning the two adjustment axes as close to the mirror face as is practical.

Figure 7:
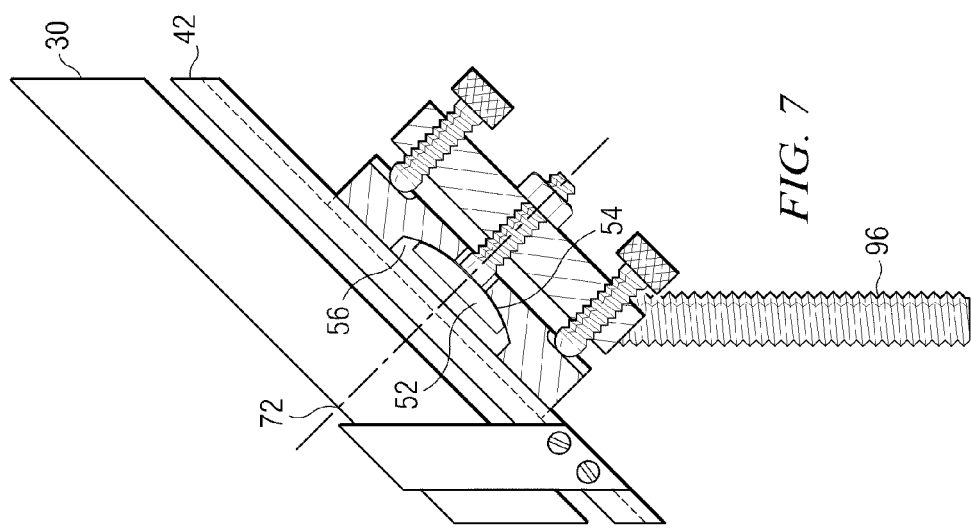
FIG. 7 is a side sectional view of a secondary mirror mount.

If it is necessary or desired to completely eliminate extraneous side to side or top to bottom translational motion when angular orientation adjustment is made, it is required that the two adjustment axes be not only parallel to the plane of the mirror face, but in the plane of the mirror face. An alternative embodiment featuring adjustment axes which functionally operate in the plane of the mirror face is presented in FIG. 7. The FIG. 7 embodiment is substantially similar in structure to the embodiment of FIGS. 4 and 5 however, the head 52 of the pivot stud 50 and curved surface 54 of the receptacle 56 are precisely fabricated into spherical surfaces which mutually define a spherical articulation path with a center point 72 on the surface of the mirror. Thus, center point 72 is a virtual pivot axis which coincides with the mirror plane. An implementation such as shown in FIG. 7 requires careful fabrication of the adjustment screw disk 48 in order to avoid interference with one set of adjustment screws when the other adjustment screws are actuated.

Figure 8:
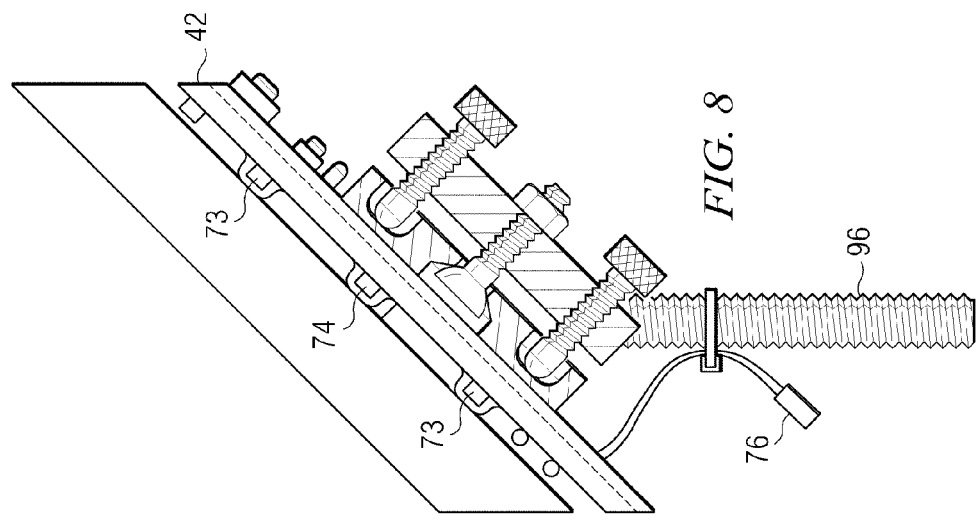
FIG. 8 is a side sectional view of a secondary mirror mount with electronic heating apparatus.

FIG. 8 illustrates a secondary mirror mount 40 which is similar to that of FIGS. 4 and 5. In this embodiment, however, the mirror backing plate 42 is implemented as an etched and plated through printed circuit board. On the side of the mirror backing plate 42 which faces the secondary mirror 30 small heater chips 73 and a temperature sensing chip or chips such as a thermocouple 74 may be included as part of the circuit fabricated on the mirror backing plate 42. These electrical elements may be utilized to provide a small quantity of heat directly to the secondary mirror to avoid the accumulation of condensation when a Newtonian telescope is used under dew-generating atmospheric conditions. The circuit including the heater chips 73 and optional temperature sensing chip(s) 74 may be connected to an outboard controller and power supply with a small electrical lead 76.

Figure 9:
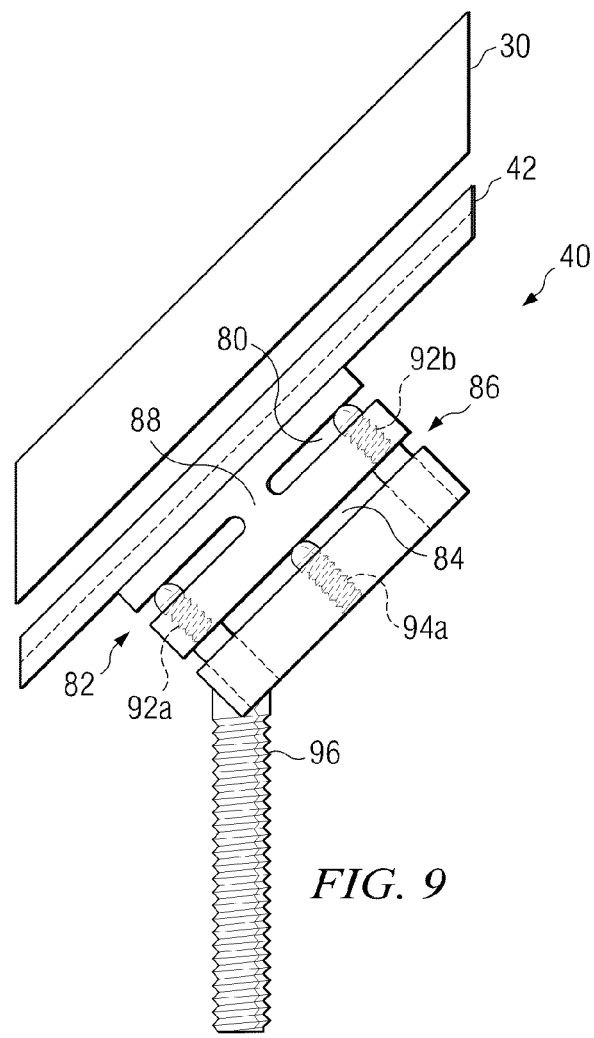
FIG. 9 is a side sectional view of a secondary mirror mount.
Figure 10:
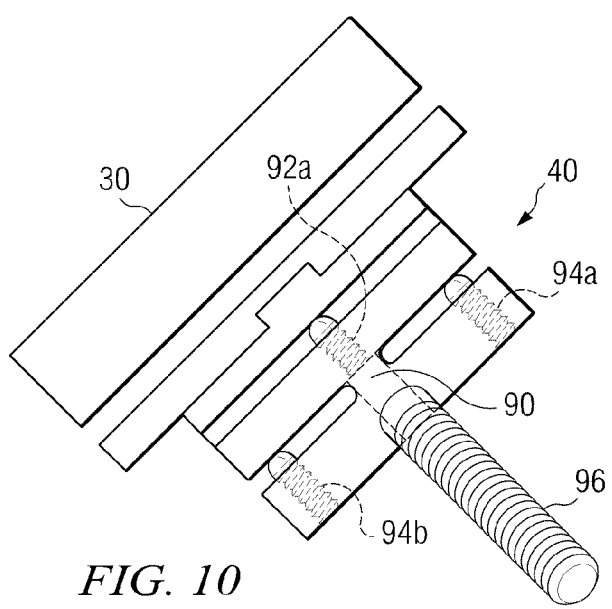
FIG. 10 is an end sectional view of the secondary mirror mount of FIG. 4.

FIGS. 9 and 10 illustrate an alternative method of implanting a mount body 44 which also provides for the angular adjustment of an attached secondary mirror 30 along two adjustment axes which are parallel to the mirror plane. The mount body 44 of FIGS. 9 and 10 includes at least one slot 80 through a portion of the mount body 44 which is planar parallel to the mirror plane. The slot 80 defines a first compliant hinge 82 in the mount body which is parallel to a first adjustment axis. A similar second slot 84 may be formed through a different portion of the mount body 44 to create a second compliant hinge 86. The second compliant hinge 86 is parallel to the second adjustment axis. It is advantageous but not mandatory that the first and second compliant hinges articulate about first and second adjustment axes which are orthogonal to each other. It is critical to achieve the advantages described herein that both the first and second compliant hinges articulate about first and second angular adjustment axes which are parallel to the plane defined by the secondary mirror face.

As shown in FIGS. 9 and 10 multiple slots may be used to define webs 88 and 90 in the mount body 44 such that the compliant hinges 82 and 86 articulate at the center of the mount body 44. Alternatively, as shown in FIG. 11 a single slot may be formed at each compliant hinge which is articulated toward an edge of the mirror body 44. In either embodiment, articulation may be accomplished by one or more adjustment screws per hinge, for example, screws 92a and 92b or 94a and 94b which are placed in threaded engagement with the mount body and may be made to advance into contact with the mount body opposite the first slot 80 or second slot 84 thereby articulating the respective compliant hinge about its adjustment axis. As described above with respect to the fully articulated embodiments, a compliant hinge embodiment of the mount body 44 may include adjustment screws which have any type of head, including but not limited to, knurled thumb screws, Allen sockets or traditional screw or bolt heads.

The mount body 44 of the FIGS. 9-11 embodiment may be fabricated by machining, molding or otherwise forming slot in a unified single or solid piece of material. The mount body 44 of this embodiment may be fabricated from a metal such as aluminum or stainless steel, a plastic, rubber, wood or any other material which can be articulated at a web over a suitable range of motion without experiencing premature failure or inelastic deformation. The compliant hinge embodiment of the mount body 44 may be associated with any means for attaching a Newtonian telescope secondary mirror 30 such as a mirror backing plate 42 as described above. The mirror backing plate 42 or other means for attaching a secondary mirror may optionally feature a selectively adjustable engagement with the mount body 44 which provides for offset position adjustment as described above. In addition, the mount body 44 of this embodiment may be associated with any of the means described for attaching a secondary mount to a spider assembly described below.

Figure 1:
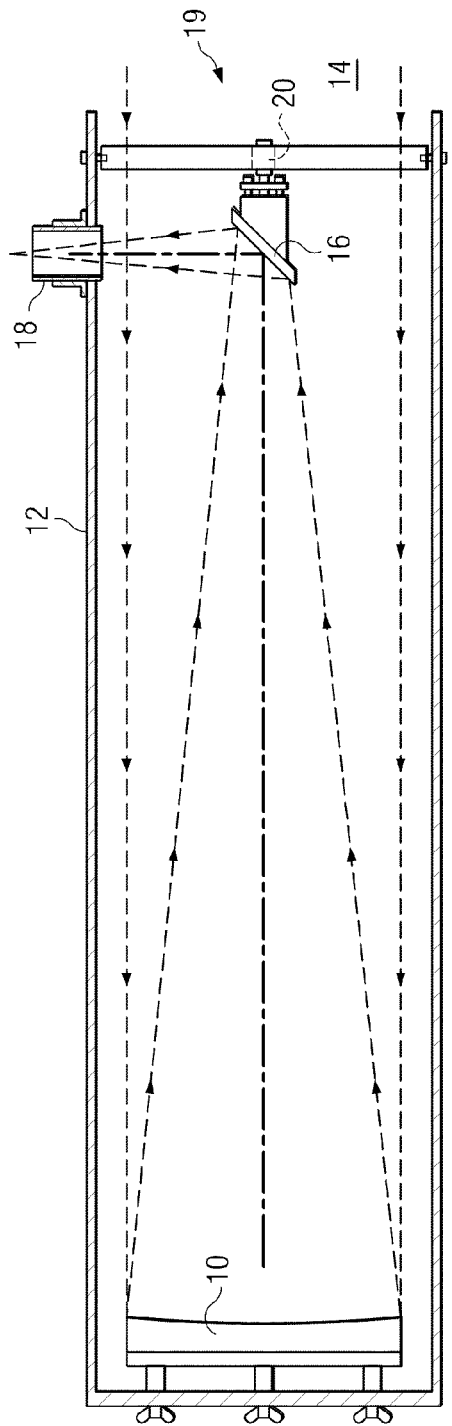
FIG. 1 is a sectional view of a prior art Newtonian telescope.

The various embodiments described above include a bolt 96 which may be engaged with the central hub of a conventional Newtonian telescope spider assembly such as the spider assembly 20 of FIG. 1. This type of connection to a spider assembly is suitable for many Newtonian telescope implementations, in particular those featuring a conventional telescope tube 12. Certain Newtonian telescope designs, however, may be most effectively implemented with a relatively narrow secondary cage supporting the focuser, spider assembly and secondary mount. Lightweight open truss tube telescope designs for example are often implemented with a single ring or relatively low profile secondary cage supporting the secondary spider and focuser. In such an implementation the compressed distance of the secondary mirror and the spider assembly may be problematic.

Figure 13:
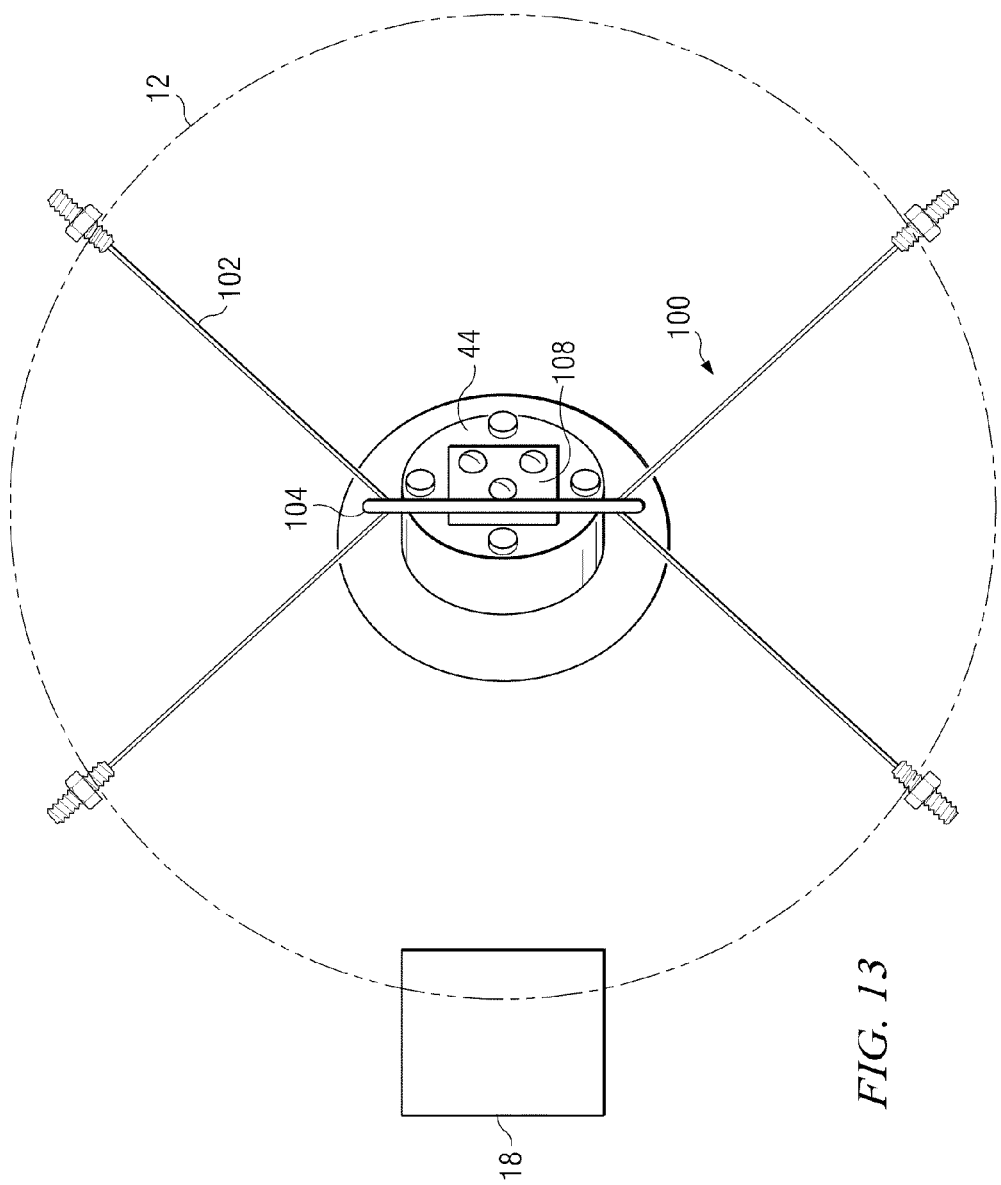

FIGS. 12 and 13 illustrate embodiments of low-profile spider assemblies 100 and apparatus for connecting a secondary mount 40 such as described herein to a telescope tube or secondary ring or cage. In each of the FIGS. 12 and 13 embodiments, the mount body 44 and means for attaching a secondary mirror 30 to the mount body 44 may be implemented with any of the structures described herein. The embodiments of FIGS. 12 and 13 include a spider assembly 100 having attachment vanes 102 and a yoke plate 104. The yoke plate 104 includes two slots 106 configured to receive the vanes 102. In the embodiment illustrated, the vanes 102 are implemented with two strips of thin, high strength material such as sheet metal or carbon fiber matrix embedded with a resin such as epoxy. The vanes have a bolt or other suitable connection apparatus at each end. A vane 102 is fed through a slot 106 in the yoke plate 104 which engages vane 102 at substantially midpoint. Accordingly, each vane may be forced to form an angle with the apex of the angle at the slot 106 of the yoke plate 104. When either or both ends of a vane 102 are secured against the telescope tube or ring, the yoke plate 104 is rigidly supported in substantially the center of the tube.

In the embodiments shown in FIGS. 12 and 13 the angle formed by the vanes at the yoke plate 104 is substantially a right angle. This may be desirable to certain astronomers since the diffraction spikes formed in a star image by the vanes will be at right angles, which is the traditional and expected view of diffraction spikes. It is not necessary, however, that the angle formed by the vanes be a right angle provided the user prefers or is indifferent to diffraction spikes on a stellar image radiating at a different angle. Furthermore, the opposing sides of opposite vanes 102 in the embodiment illustrated in FIGS. 12 and 13 are parallel but not co-linear. This configuration enhances secondary mount stability and minimizes the number of diffraction spikes appearing on stellar images.

As is best shown on FIG. 12, the mount body 44 may be adjustably connected to the yoke plate 104 with a tongue 108. The tongue 108 and/or yoke plate 104 may include slots and screws, or similar structures which provide for the adjustment of the position of the mount body 44 along the optical axis of the primary mirror. This adjustment in conjunction with the lateral offset adjustment of the mirror backing plate 42 with respect to the mount body 44 described above allows for an appropriate total offset which may be desired for optimum Newtonian optical system performance.

Another embodiment disclosed herein is a method of adjusting the orientation of a Newtonian telescope secondary mirror which is part of the overall method of properly collimating a Newtonian telescope. The method includes adjusting the angular orientation of a Newtonian telescope secondary mirror about first and second adjustment axes both of which are parallel to the mirror plane of the Newtonian telescope secondary mirror. Any of the embodiments of apparatus described herein, or any apparatus which function in a similar manner may be used to implement and accomplish the angular orientation adjustments. The method may also include offsetting the position of the Newtonian secondary mirror along a line parallel to the major axis of the secondary mirror. In addition, the method may optionally include adjusting the position of the secondary mirror along a line parallel to the optical axis of the Newtonian primary mirror.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

The description of the present invention has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiment described and shown in the figures was chosen and described in order to best explain the principles of the invention, the practical application, and to enable others of ordinary skill in the art to understand the invention for various embodiments with various modifications as are suited to the particular use contemplated. Various embodiments of the disclosure could also include permutations of the various elements recited in the claims as if each dependent claim was multiple dependent claim incorporating the limitations of each of the preceding dependent claims as well as the independent claims. Such permutations are expressly within the scope of this disclosure.

What is claimed is:

1. A Newtonian telescope secondary mirror mount comprising:
   attachment means for attaching a Newtonian telescope secondary mirror to the secondary mirror mount wherein said attachment means defines a secondary mirror plane oriented diagonally with respect to a primary optical axis;
   first adjustment means for adjusting an angular alignment of the secondary mirror plane which first adjustment means defines a first adjustment axis which is substantially parallel to the secondary mirror plane; and
   second adjustment means for adjusting the angular alignment of the secondary mirror plane which second adjustment means defines a second adjustment axis which is substantially parallel to the secondary mirror plane.

2. The Newtonian telescope secondary mirror mount of claim 1 wherein the first adjustment axis and the second adjustment axis are substantially orthogonal to each other.

3. The Newtonian telescope secondary mirror mount of claim 1 wherein the first adjustment axis and the second adjustment axis are substantially co-planar with the secondary mirror plane.

4. The Newtonian telescope secondary mirror mount of claim 1 wherein the attachment means comprises a mirror backing plate.

5. The Newtonian telescope secondary mirror mount of claim 4 further comprising a mount body operatively associated with the mirror backing plate.

6. The Newtonian telescope secondary mirror mount of claim 5 wherein the mount body comprises:
   a pivot disk;
   a pivot stud in articulated association with the pivot disk;
   an adjustment screw disk operatively associated with the pivot stud;
   a first adjustment screw in threaded engagement with the adjustment screw disk and located away from the pivot stud along a line perpendicular to the first adjustment axis; and
   a second adjustment screw in threaded engagement with the adjustment screw disk and located away from the pivot stud along a line perpendicular to the second adjustment axis, wherein the first and second adjustment screw may be made to advance in contact with the pivot disk and thereby articulate the pivot disk about the first or second adjustment axis.

7. The Newtonian telescope secondary mirror mount of claim 5 wherein the mount body comprises:
   a first slot through a select portion of the mount body wherein the first slot is planar parallel to the mirror plane and defines a first compliant hinge in the mount body parallel to the first adjustment axis; and
   a second slot through a select portion of the mount body wherein the second slot is planar parallel to the mirror plane and defines a second compliant hinge in the mount body parallel to the second adjustment axis.

8. The Newtonian telescope secondary mirror mount of claim 7 further comprising:
   a first adjustment screw in threaded engagement with the mount body that may be made to advance into contact with the mount body opposite the first slot thereby articulating the first compliant hinge about the first adjustment axis; and
   a second adjustment screw in threaded engagement with the mount body that may be made to advance into contact with the mount body opposite the second slot thereby articulating the second compliant hinge about the second adjustment axis.

9. The Newtonian telescope secondary mirror mount of claim 5 further comprising a selectively adjustable engagement between the mirror backing plate and the mount body.

10. The Newtonian telescope secondary mirror mount of claim 9 wherein the selectively adjustable engagement between the mirror backing plate and the mount body comprises a slot which provides for sliding adjustment of the mirror backing plate along a line parallel to the major axis of a secondary mirror that may selectively be attached to the backing plate.

11. The Newtonian telescope secondary mirror mount of claim 4 wherein the mirror backing plate comprises at least one heating element.

12. The Newtonian telescope secondary mirror mount of claim 1 further comprising means for connecting the secondary mirror mount to a spider.

13. The Newtonian telescope secondary mirror mount of claim 12 wherein the connecting means comprises:
   a yoke in operative association with a spider; and
   a tongue operatively disposed between the yoke and attachment means.

14. The Newtonian telescope secondary mirror mount of claim 12 wherein the connecting means comprises a threaded bolt.

15. A Newtonian telescope secondary mirror mount comprising:
   attachment means for attaching a Newtonian telescope secondary mirror to the secondary mirror mount wherein the secondary mirror has a major axis and a mirror axis with the major axis being oriented diagonally with respect to a primary optical axis;
   a mount body; and
   a selectively adjustable engagement between the attachment means and the mount body which provides for the selective adjustment of the position of the attachment means with respect to the mount body along a line which is parallel to the major axis.

16. The Newtonian telescope secondary mirror mount of claim 15 wherein the selectively adjustable engagement between the attachment means and the mount body comprises a slot which provides for sliding adjustment of the attachment means along a line parallel to the major axis.

17. A method of adjusting the orientation of a Newtonian telescope secondary mirror comprising:
   adjusting the angular orientation of the Newtonian telescope secondary mirror about a first adjustment axis which is parallel to a mirror plane defined by the front surface of a Newtonian telescope secondary mirror; and
   adjusting the angular orientation of the Newtonian telescope secondary mirror about a second adjustment axis which is parallel to the mirror plane.

18. The method adjusting the orientation of a Newtonian telescope secondary mirror of claim 17 further comprising adjusting the position of the secondary mirror along a line parallel to the major axis of the secondary mirror by adjusting an engagement between a mount body and a means for attaching the secondary mirror to the mount body.

19. The method adjusting the orientation of a Newtonian telescope secondary mirror of claim 18 further comprising adjusting the position of the secondary mirror along a line parallel to the optical axis of an associated Newtonian primary mirror.

* * * * *